(12) United States Patent
Park et al.

(10) Patent No.: US 11,976,980 B2
(45) Date of Patent: May 7, 2024

(54) TEMPERATURE SENSOR AND DEVICE

(71) Applicants: Samsung Electronics Co., Ltd., Suwon-si (KR); INDUSTRY-ACADEMIC COOPERATION FOUNDATION, YONSEI UNIVERSITY, Seoul (KR)

(72) Inventors: Jin-woo Park, Seoul (KR); Seung-Rok Kim, Seoul (KR); Soyeon Lee, Seoul (KR); Ey-In Lee, Seoul (KR)

(73) Assignees: Samsung Electronics Co., Ltd., Gyeonggi-do (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 17/979,925

(22) Filed: Nov. 3, 2022

(65) Prior Publication Data

US 2023/0243705 A1 Aug. 3, 2023

(30) Foreign Application Priority Data

Jan. 28, 2022 (KR) .................. 10-2022-0013640

(51) Int. Cl.
*G01J 5/35* (2022.01)
*G01J 5/04* (2006.01)

(52) U.S. Cl.
CPC ............... *G01J 5/35* (2022.01); *G01J 5/046* (2013.01)

(58) Field of Classification Search
CPC .... G01J 5/35; G01J 5/046; G01J 5/34; G01K 7/003; G01K 7/34; G06F 1/163; H01L 29/40111; H10N 15/15
See application file for complete search history.

(56) References Cited

U.S. PATENT DOCUMENTS

| | | | | |
|---|---|---|---|---|
| 5,273,910 A | * | 12/1993 | Tran | H01L 27/146 438/69 |
| 2010/0239647 A1 | * | 9/2010 | Byrne | A61K 9/0009 422/537 |
| 2011/0149410 A1 | * | 6/2011 | Blum | G02B 3/14 359/666 |
| 2011/0182322 A1 | * | 7/2011 | Kamikawa | G01J 5/20 374/E1.018 |
| 2011/0267680 A1 | * | 11/2011 | Aschwanden | G02B 7/023 29/842 |

(Continued)

FOREIGN PATENT DOCUMENTS

| | | | | | |
|---|---|---|---|---|---|
| JP | 2000155050 A | * | 6/2000 | | G01J 1/02 |
| JP | 2008198425 A | * | 8/2008 | | C08K 3/04 |
| JP | 5728706 B2 | * | 3/2015 | | G01J 1/02 |

OTHER PUBLICATIONS

Chen, PVDF-Based Ferroelectric Polymers in Modern Flexible Electronics, 2017, Advanced Electronic Materials, DOI:10.1002/aelm.201600460 (Year: 2017).*

(Continued)

*Primary Examiner* — David P Porta
*Assistant Examiner* — Gisselle M Gutierrez
(74) *Attorney, Agent, or Firm* — Harness, Dickey & Pierce, P.L.C.

(57) ABSTRACT

A temperature sensor includes a first electrode, second electrode, and a pyroelectric layer between the first electrode and the second electrode. The pyroelectric layer includes a ferroelectric polymer and an ionogel.

19 Claims, 8 Drawing Sheets

(56) References Cited

U.S. PATENT DOCUMENTS

| | | | |
|---|---|---|---|
| 2017/0133714 A1* | 5/2017 | Ayme-Perrot | C08J 3/11 |
| 2018/0242851 A1 | 8/2018 | Van Den Ende et al. | |
| 2020/0148873 A1* | 5/2020 | He | C08K 5/3417 |
| 2021/0341414 A1* | 11/2021 | Ersoez | G01N 27/333 |

OTHER PUBLICATIONS

Sahrash, PVDF based ionogels: applications towards electrochemical devices and membrane separation processes, Materials Science vol. 4, Issue 11, Nov. 2018 (Year: 2018).*

Yan Zheng et al., "Highly sensitive electronic skin with a linear response based on the strategy of controlling the contact area", Nano Energy, 85, 106013, Mar. 20, 2021, https://doi.org/10.1016/j.nanoen.2021.106013.

Fengjiao Zhang et al., "Flexible and self-powered temperature-pressure dual-parameter sensors using microstructure-frame-supported organic thermoelectric materials", Nature Communications, Sep. 21, 2015.

* cited by examiner

TEMPERATURE SENSOR AND DEVICE

CROSS-REFERENCE TO RELATED APPLICATION

This application claims priority to and the benefit of Korean Patent Application No. 10-2022-0013640 filed in the Korean Intellectual Property Office on Jan. 28, 2022, the entire contents of which are incorporated herein by reference.

BACKGROUND

1. Field

Inventive concepts relate to temperature sensors and devices including same.

2. Description of the Related Art

A system in which a plurality of sensors are integrated, such as wearable devices, electronic skin, or Internet of Things (IoT), is required to have a sensor with high accuracy while consuming less power. A conventional temperature sensor requires an external energy source through periodic charging and the like, and thus may not continuously monitor a temperature and in addition, outputs a voltage depending on temperature changes, from which an absolute temperature may not be calculated.

SUMMARY

Some example embodiments provide a temperature sensor capable of realizing high accuracy while operating by its own power (e.g., a power source that is internal to the temperature sensor).

Some example embodiments provide a device including a temperature sensor.

According to some example embodiments, a temperature sensor includes a first electrode, a second electrode, and a pyroelectric layer between the first electrode and the second electrode and including a ferroelectric polymer and an ionogel.

A Curie temperature of the ferroelectric polymer may be about 60° C. to about 140° C.

The ferroelectric polymer may include a fluorine-containing polymer.

The ferroelectric polymer may be a homopolymer including a vinylidene fluoride structural unit, a copolymer including a vinylidene fluoride structural unit, or any combination thereof.

The ferroelectric polymer may be a copolymer including the vinylidene fluoride structural unit and a trifluoroethylene structural unit.

The ionogel may be a composite of a polymer matrix and an ionic liquid.

The ferroelectric polymer and the polymer matrix may each include at least one same structural unit.

The at least one same structural unit of the ferroelectric polymer and the polymer matrix may include vinylidene fluoride.

The ionic liquid may be included in the ionogel in an amount of about 100 parts by weight to about 400 parts by weight based on 100 parts by weight of the polymer matrix in the ionogel.

The pyroelectric layer may include a composite of the ferroelectric polymer and the ionogel.

The pyroelectric layer may include a first layer including the ferroelectric polymer, and a second layer on one or opposite surfaces of the first layer and including the ionogel.

The ionogel may be a composite of a matrix polymer and an ionic liquid, and the ferroelectric polymer and the matrix polymer may include a homopolymer, a copolymer, or any combination thereof, wherein the ferroelectric polymer and the matrix polymer may be different polymers and may each include a same vinylidene fluoride structural unit.

The ionic liquid may include a cation including a lithium ion, pyridinium, imidazolium, pyrrolidinium, piperidinium, ammonium, phosphonium, sulfonium, a derivative thereof, or any combination thereof, and an anion including a halogen ion, tetrafluoroborate, hexafluorophosphate, triflate, trifluoromethanesulfonyl, bis(trifluoromethanesulfonyl)imide, bis(fluorosulfonyl)imide, cyanoguanidine, a hydrogen sulfate ion, ethyl sulfuric acid, a derivative of, or any combination thereof.

The first electrode and the second electrode may be stretchable electrodes.

Each stretchable electrode of the stretchable electrodes may include an elastomer and a conductive nanostructure.

The temperature sensor may provide a self-powered sensor configured to generate a voltage according to a temperature change at the temperature sensor exclusively of any electrical power from any energy supply device that is external to the temperature sensor.

The temperature sensor may be configured to sense an absolute temperature.

A temperature change rate with respect to a time sensed by the temperature sensor may be lower than a temperature change rate of a temperature change of a measurement target, and the temperature sensor may be configured to cause a voltage output from the temperature sensor according to the temperature change of the measurement target to be delayed with respect to time.

According to some example embodiments, a device including the temperature sensor is provided.

The device may be a wearable device.

The temperature sensor according to some example embodiments may be configured to enable an absolute temperature to be measured with high accuracy while the temperature sensor is operating on its own power.

DETAILED DESCRIPTION

Figure 1:
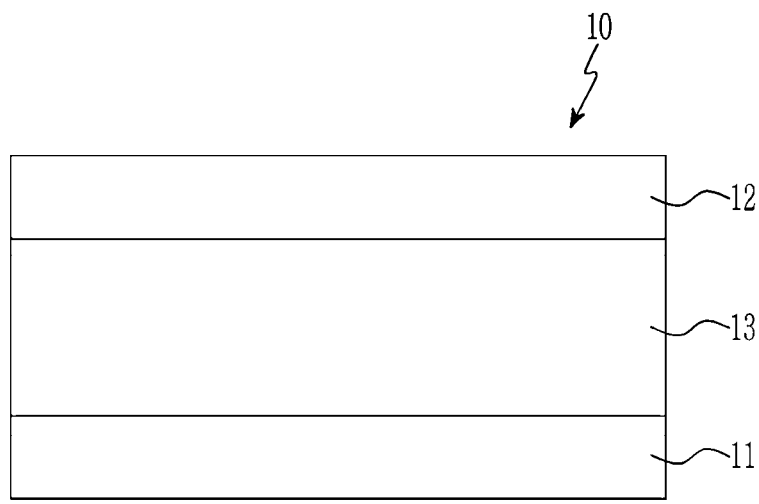
FIG. 1 is a cross-sectional view showing a temperature sensor according to some example embodiments.

Hereinafter, example embodiments are described in detail so that those skilled in the art can easily implement them. However, the actual applied structure may be implemented in various different forms and is not limited to the implementations described herein.

In the drawings, the thickness of layers, films, panels, regions, etc., are exaggerated for clarity.

It will be understood that when an element such as a layer, film, region, or substrate is referred to as being "on" another element, it may be directly on the other element or intervening elements may also be present. In contrast, when an element is referred to as being "directly on" another element, there are no intervening elements present. It will further be understood that when an element is referred to as being "on" another element, it may be above or beneath or adjacent (e.g., horizontally adjacent) to the other element.

As used herein, when a definition is not otherwise provided, "substituted" refers to replacement of a hydrogen atom of a compound or a functional group by a substituent selected from a halogen atom, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a silyl group, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroaryl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and any combination thereof.

Hereinafter, "combination" refers to a mixture and a stacked structure of two or more.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%).

It will be understood that elements and/or properties thereof may be recited herein as being "identical" to, "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the inventive concepts.

Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

Hereinafter, a temperature sensor according to some example embodiments is described.

Figure 2:
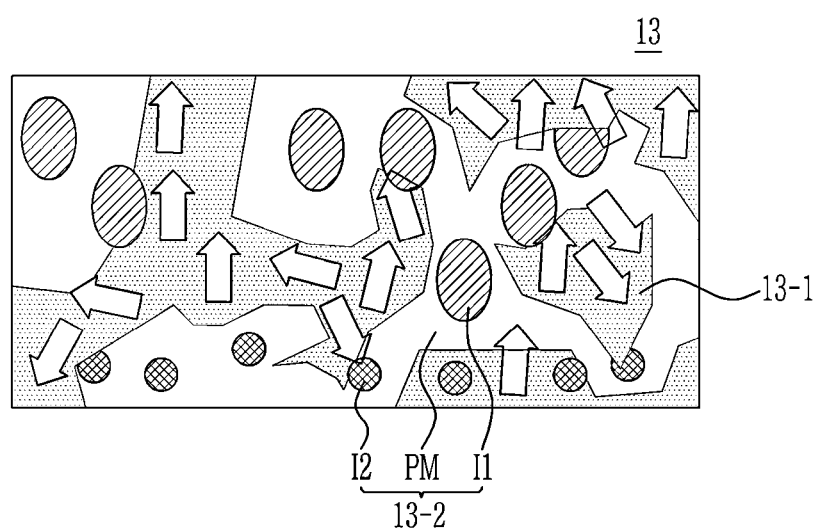
FIG. 2 is a schematic view showing a pyroelectric layer of the temperature sensor of FIG. 1 according to some example embodiments.

FIG. 1 is a cross-sectional view showing some example embodiments of a temperature sensor according to some example embodiments, and FIG. 2 is a schematic view showing an example of a pyroelectric layer of the temperature sensor of FIG. 1 according to some example embodiments.

Referring to FIG. 1, a temperature sensor 10 according to some example embodiments includes a first electrode 11, a second electrode 12, and a pyroelectric layer 13.

Each of the first electrode 11 and the second electrode 12 may include a conductor, for example, a metal, a conductive oxide, a conductive polymer, a conductive nanostructure, or any combination thereof, for example, gold (Au), silver (Ag), copper (Cu), nickel (Ni), aluminum (Al), molybdenum (Mo), chromium (Cr), tantalum (Ta), titanium (Ti), an alloy thereof, zinc oxide, indium oxide, tin oxide, indium tin oxide (ITO), indium zinc oxide (IZO), or fluorine-doped tin oxide, poly(3,4-ethylenedioxythiophene (PEDOT), poly(3,4-ethylenedioxythiophene) polystyrene sulfonate (PEDOT:PSS), metal nanoparticles, carbon nanoparticles, or any combination thereof, but is not limited thereto.

For example, the first electrode 11 and the second electrode 12 may be stretchable electrodes. The stretchable electrodes may flexibly respond to an external force or external movement, such as twisting, pressing, and pulling in a particular (or, alternatively, predetermined) direction. The stretchable electrodes may include stretchable conductors or may have a stretchable shape such as a wavy shape, a wrinkle shape, a popup shape, or a non-coplanar mesh shape.

For example, the first electrode 11 and the second electrode 12 may include conductive nanostructures. The conductive nanostructures may be, for example, structures having a size of several to tens of nanometers (e.g., long diameter), and may include, for example, nanotubes, nanowires, nanoplates, nanoflakes, nanofibers, nanocomposites, nanoparticles, or any combination thereof, but are not limited thereto. For example, the conductive nanostructures may include carbon nanotubes, carbon nanowires, carbon nanoplates, carbon nanoflakes, carbon nanofibers, carbon nanocomposites, carbon nanoparticles, metal nanotubes, metal nanowires, metal nanoplates, metal nanoflakes, metal nanofibers, metal nanocomposites, metal nanoparticles, graphene, or any combination thereof, but are not limited thereto.

For example, the conductive nanostructures may be wire-type nanostructures that are long in one direction, and may have, for example, an aspect ratio of length:width of greater than or equal to about 10 (e.g., 10:1). For example, the conductive nanostructures may include carbon nanotubes, carbon nanowires, carbon nanoplates, carbon nanoflakes, carbon nanofibers, carbon nanocomposites, metal nanotubes, metal nanowires, metal nanoplates, metal nanoflakes, metal nanofibers, metal nanocomposites, or any combination thereof which have an aspect ratio of about 10 to about $10^6$, about $10^2$ to about $10^6$, or about $10^3$ to about $10^6$, but are not limited thereto.

For example, the conductive nanostructure may be embedded in an elastomer or disposed on the elastomer. The elastomer may include, for example, an organic or organic-inorganic elastomer, for example, a polyorganosiloxane such as polydimethylsiloxane (PDMS), an elastomer including a butadiene moiety such as styrene-ethylene-butylene-styrene (SEBS), an elastomer including a urethane moiety, an elastomer including an acrylic moiety, an elastomer including an olefin moiety, a derivative thereof, or any combination thereof, but is not limited thereto.

The pyroelectric layer 13 may be between (e.g., directly between) the first electrode 11 and the second electrode 12, and for example, one surface of the pyroelectric layer 13 may be in contact (e.g., direct contact) with the first electrode 11, and the other surface may be in contact with the second electrode 12. In some example embodiments, the pyroelectric layer 13 may be indirectly between the first electrode 11 and the second electrode 12, such that at least one additional interposing layer is between pyroelectric layer 13 and the first electrode 11 and isolates the pyroelectric layer 13 and the first electrode 11 from direct contact with each other and/or at least one additional layer is between pyroelectric layer 13 and the second electrode 12 and isolates the pyroelectric layer 13 and the second electrode 12 from direct contact with each other.

The pyroelectric layer 13 may exhibit pyroelectric properties (e.g., generate a voltage in response to a change in temperature of the pyroelectric layer 13) due to ferroelectricity. For example, the pyroelectric layer 13 may be configured to exhibit induced spontaneous polarization in the pyroelectric layer 13, resulting in a generated voltage at the pyroelectric layer 13 and which may further result in generation (e.g., transmission) of an electrical signal by the temperature sensor 10, based on an instantaneous temperature change of at least a portion of the pyroelectric layer 13, and a voltage (e.g., electrical signal) may be generated at the pyroelectric layer 13 (e.g., the pyroelectric layer 13 may be configured to generate a voltage) according to the degree (e.g., the magnitude) of spontaneous polarization (e.g., the magnitude of the voltage or generated electrical signal may be proportional to a change in the magnitude of the spontaneous polarization). As a result, the pyroelectric layer 13 may be configured to generate usable electrical power to enable the temperature sensor 10 to operate (e.g., to measure temperature and/or generate signals indicating a temperature sensed by the temperature sensor), for example to operate without using any electrical power received from an external electrical power source that is external to the temperature sensor 10. Thus, due to the aforementioned pyroelectric properties that the pyroelectric layer 13 is configured to exhibit, the temperature sensor 10 may be configured to be used as a self-powered sensor that can operate without a separate external energy source (e.g., without using any electrical power from any external electrical power source).

In some example embodiments, the pyroelectric layer 13 includes a ferroelectric polymer and an ionogel.

The ferroelectric polymer may be a polymer exhibiting ferroelectricity (e.g., configured to exhibit ferroelectricity). The ferroelectric polymer may exhibit the aforementioned pyroelectric properties at or below the Curie temperature of the ferroelectric polymer (e.g., the temperature above which the ferroelectric polymer may lose permanent electrical properties, for example based on intrinsic electrical dipole moments of the ferroelectric polymer change direction), and as the temperature increases below the Curie temperature (e.g., as the temperature of the ferroelectric polymer increases within a range of temperatures that is below the Curie temperature), the change in polarization of the ferroelectric polymer becomes larger, thereby resulting in the ferroelectric polymer exhibiting effective pyroelectric properties. On the other hand, since the ferroelectric polymer does not have spontaneous polarization at a temperature higher than the Curie temperature, it may lose ferroelectricity and thus may not exhibit the aforementioned pyroelectric properties at a temperature higher than the Curie temperature.

Accordingly, the ferroelectric polymer included in the pyroelectric layer 13 may be selected from materials having an appropriate Curie temperature according to an application purpose of the temperature sensor 10, and for example, a temperature sensor 10 applied to (e.g., configured to be included in) a wearable device attached to or worn on a body may for example include a ferroelectric polymer having a higher Curie temperature than a body temperature, for example, a ferroelectric polymer having a Curie temperature of less than or equal to about 140° C. and within the range, about 60° C. to about 140° C. Within a temperature range close to the aforementioned Curie temperature (e.g., within a temperature range of about 1° C. to about 150° C. below the aforementioned Curie temperature of the ferroelectric polymer), effective pyroelectric properties may be obtained (e.g., exhibited by the pyroelectric layer 13), thereby enabling effective operation of the temperature sensor 10 to measure temperature without using any electrical power received from an external electrical power source that is external to the temperature sensor 10.

The ferroelectric polymer may include, for example, a fluorine-containing ferroelectric polymer. The fluorine-containing ferroelectric polymer may include one or more structural units having at least one fluorine, and may include, for example, a vinylidene fluoride (VDF) structural unit, a trifluoroethylene (TrFE) structural unit, or any combination thereof.

For example, the ferroelectric polymer may include a homopolymer, a copolymer, or any combination thereof which includes a vinylidene fluoride (VDF) structural unit, and may be, for example, a copolymer including a vinylidene fluoride (VDF) structural unit and a trifluoroethylene (TrFE) structural unit.

For example, the Curie temperature, also referred to as the Curie point, of the ferroelectric polymer may be determined depending on structural units constituting the copolymer and a ratio thereof, wherein the ratio of the structural units may be appropriately adjusted to secure the aforementioned Curie temperature. For example, a Curie temperature of a vinylidene fluoride-trifluoroethylene (VDF-TrFE) copolymer including about 25 moles of trifluoroethylene (TrFE) based on about 100 moles of vinylidene fluoride (VDF) may be about 140° C., a Curie temperature of a vinylidene fluoride-trifluoroethylene (VDF-TrFE) copolymer including about 33 moles of trifluoroethylene (TrFE) based on about 100 moles of vinylidene fluoride (VDF) may be about 110° C., a Curie temperature of a vinylidene fluoride-trifluoroethylene (VDF-TrFE) copolymer including about 40 moles of trifluoroethylene (TrFE) based on about 100 moles of vinylidene fluoride (VDF) may be about 100° C., and a Curie temperature of a vinylidene fluoride-trifluoroethylene (VDF-TrFE) copolymer including about 80 moles of trifluoroethylene (TrFE) based on about 100 moles of vinylidene fluoride (VDF) may be about 60° C. For example, for the purpose of measuring a body temperature, a vinylidene fluoride-trifluoroethylene (VDF-TrFE) copolymer having a Curie temperature closest to the body temperature may include about 80 moles of trifluoroethylene (TrFE) based on about 100 moles of vinylidene fluoride (VDF).

The ionogel may be a composite of an ionic liquid and a polymer matrix.

The ionic liquid may be a liquid salt composed of ions, and may be composed of an organic or inorganic cation and an inorganic or organic anion. The organic or inorganic cation may include, for example, a lithium ion, pyridinium, imidazolium, pyrrolidinium, piperidinium, ammonium, phosphonium, sulfonium, a derivative thereof, or any combination thereof and the inorganic or organic anion may include, for example, a halogen ion, tetrafluoroborate, hexafluorophosphate, triflate, trifluoromethanesulfonyl, bis(trifluoromethanesulfonyl)imide, bis(fluorosulfonyl)imide, cyanoguanidine, a hydrogen sulfate ion, ethyl sulfate, a derivative thereof, or any combination thereof.

The polymer matrix may immobilize the ionic liquid or control the movement of ions in the ionic liquid. The ionic liquid may be embedded in the polymer matrix. The polymer matrix may, for example, have ferroelectric properties and may be the same as or different from the aforementioned ferroelectric polymers.

The polymer matrix may be, for example, a fluorine-containing polymer matrix, and may include, for example, a vinylidene fluoride (VDF) structural unit, a hexafluoropropylene (HFP) structural unit, a trifluoroethylene (TrFE) structural unit, a chlorofluoroethylene (CFE) structural unit, a chlorodifluoroethylene (CDFE) structural unit, a chlorotrifluoroethylene (CTFE) structural unit, or any combination thereof.

For example, the aforementioned ferroelectric polymer and the polymer matrix may include at least one structural unit in common (e.g., a same at least one structural unit), for example, a vinylidene fluoride (VDF) structural unit in common.

For example, the ferroelectric polymer may be polyvinylidene fluoride (PVDF) including (e.g., comprising or consisting of) vinylidene fluoride (VDF) structural units, and the polymer matrix may include a copolymer including a vinylidene fluoride (VDF) structural unit and a hexafluoropropylene (HFP) structural unit, a trifluoroethylene (TrFE) structural unit, a chlorofluoroethylene (CFE) structural unit, a chlorodifluoroethylene (CDFE) structural unit, a chlorotrifluoroethylene (CTFE) structural unit, or any combination thereof.

For example, the ferroelectric polymer may be polyvinylidene fluoride (PVDF) including (e.g., comprising or consisting of) vinylidene fluoride (VDF) structural units, and the polymer matrix may be a copolymer including a vinylidene fluoride (VDF) structural unit and a trifluoroethylene (TrFE) structural unit.

For example, the ferroelectric polymer may be a copolymer including a vinylidene fluoride (VDF) structural unit and a trifluoroethylene (TrFE) structural unit, and the polymer matrix may be a copolymer including vinylidene fluoride (VDF) and hexafluoropropylene (HFP) structural units.

The ionic liquid may be included in the ionogel in an amount equal to or greater than that of the polymer matrix, for example, in an amount of about 100 parts by weight to about 400 parts by weight based on about 100 parts by weight of the polymer matrix in the ionogel, within the range, in an amount of about 100 parts by weight to about 350 parts by weight, about 100 parts by weight to 300 parts by weight, about 100 parts by weight to about 200 parts by weight, or about 100 parts by weight to about 150 parts by weight based on about 100 parts by weight of the polymer matrix but is not limited thereto. For example, the ionogel may include 100 mg of the polymer matrix and about 100 mg to about 400 mg of the ionic liquid.

The pyroelectric layer 13 may include a composite of the ferroelectric polymer and the ionogel, wherein the ferroelectric polymer and the ionogel may be mixed in the pyroelectric layer 13. In the pyroelectric layer 13, the ferroelectric polymer and the ionogel may be included in a weight ratio of about 1:1 to about 1:10 and within the range, in a weight ratio of about 1:1 to about 1:8, about 1:1 to about 1:5, or about 1:1 to about 1:3 but is not limited thereto.

Referring to FIG. 2, the pyroelectric layer 13 may include a plurality of domains connected to or separated from each other, wherein the plurality of domains may include a first region 13-1 formed of (e.g., comprising) the ferroelectric polymer and a second region 13-2 formed of the ionogel. The first region 13-1 may have a polarization changed by a temperature change due to the pyroelectric properties of the ferroelectric polymer. In the second region 13-2, anions I1 and cations I2 may be dispersed in the polymer matrix PM, wherein the anions I1 and the cations I2 surrounded with the polymer matrix PM may relatively slowly behave along the polarization in the pyroelectric layer 13.

Herein, the ferroelectric polymer may be an active material which imparts pyroelectric properties to the pyroelectric layer 13, and the ionogel may be an auxiliary component serving as a path for the behavior (e.g., the movement) of the ions in the pyroelectric layer 13, that is, the anions I1 and the cations I2 in the pyroelectric layer 13.

While FIG. 2 illustrates a heterogenous mixture of the first and second regions 13-1 and 13-2, it will be understood that different mixtures, distributions, or the like of the first and second regions 13-1 and 13-2 may be present in the pyroelectric layer 13. For example, in some example embodiments the pyroelectric layer 13 may include a uniform or substantially uniform (e.g., homogenous or substantially homogenous) mixture or distribution of the first and second regions 13-1 and 13-2 therein and thus a uniform or substantially uniform (e.g., homogenous or substantially homogenous) mixture or distribution of the ferroelectric polymer and the ionogel therein, a uniform or substantially uniform (e.g., homogenous or substantially homogenous) mixture or distribution of the ferroelectric polymer and the polymer matrix therein, or the like.

If the pyroelectric layer 13 includes the ferroelectric polymer alone without the ionogel (i.e., when formed of a single domain), since the pyroelectric properties due to ferroelectricity respond only to an instantaneous temperature change, an absolute temperature may not be measured without a separate additional device such as a chopper. In some example embodiments, where the aforementioned pyroelectric layer 13 includes the ionogel to form the plurality of domains in the pyroelectric layer 13, the anions I1 and the cations I2 may move in an electric field formed by the pyroelectric layer 13 according to temperature changes, and thus delay a rate at which a voltage (e.g., electrical signal) output (e.g., generated, and thus transmitted) based on pyroelectricity changes (e.g., decreases) due to a change (e.g., decrease or halt) in sensed temperature change or rate of change, so that the pyroelectric layer 13 may still respond (e.g., cause an electrical signal to be generated and thus transmitted), even though maintained at a particular (or, alternatively, predetermined) temperature after the temperature changes, making it possible for the temperature sensor 10 to measure the absolute temperature sensed at the temperature sensor 10 without the temperature sensor 10 including or being coupled to a separate additional device such as a chopper.

Accordingly, the aforementioned temperature sensor 10, unlike general pyroelectric properties, may generate particular (or, alternatively, predetermined) charges (e.g., an electrical signal) even when there appears no temperature changes (e.g., no apparent change in temperature sensed at the temperature sensor 10), and thus the temperature sensor 10 may effectively detect the temperature changes over time and may further measure the absolute temperature. For example, a rate of the temperature changes over time which is detected in the temperature sensor 10 (e.g., sensed at the temperature sensor 10) may be lower than that of temperature changes of an object for the measurement (e.g., surrounding environment, body, or object), for example, about 2 times to about 100 times lower. For example, in response to the temperature of a measurement target (which may be in contact with the temperature sensor 10) changing over time at a particular rate "x", the temperature sensor 10 may generate (e.g., transmit) an electrical signal indicating a temperature change at a rate of 0.5*x (e.g., one-half the actual rate of change of the temperature of the measurement target). Additionally, when the temperature of the measurement target stops changing, the temperature sensor 10 may continue to generate (e.g., transmit) an electrical signal which may indicate (e.g., may be processed, such as processed by a processor, to determine) the absolute temperature of the measurement target. As described herein, generating an electrical signal at the temperature sensor 10 may include the temperature sensor 10 transmitting the electrical sensor to an external device (e.g., a processor electrically coupled to the temperature sensor 10 via a bus as described with reference to the electronic device shown in FIG. 6).

Hereinafter, a temperature sensor according to some example embodiments is described.

Figure 3:
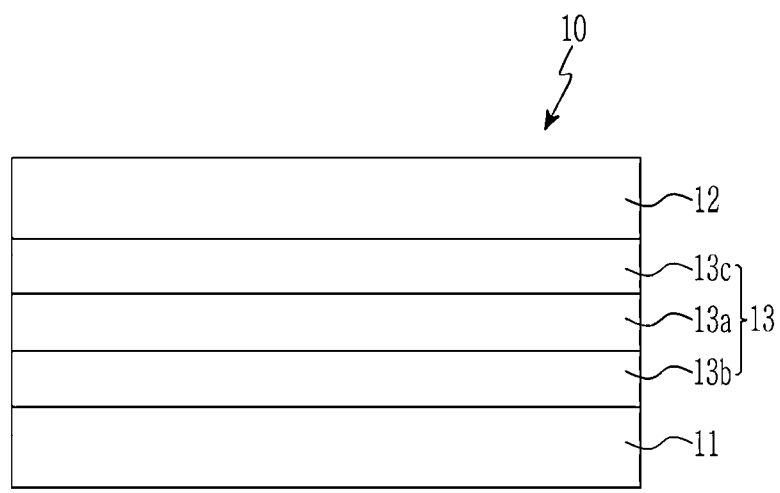
FIG. 3 is a cross-sectional view showing a temperature sensor according to some example embodiments.
Figure 4:
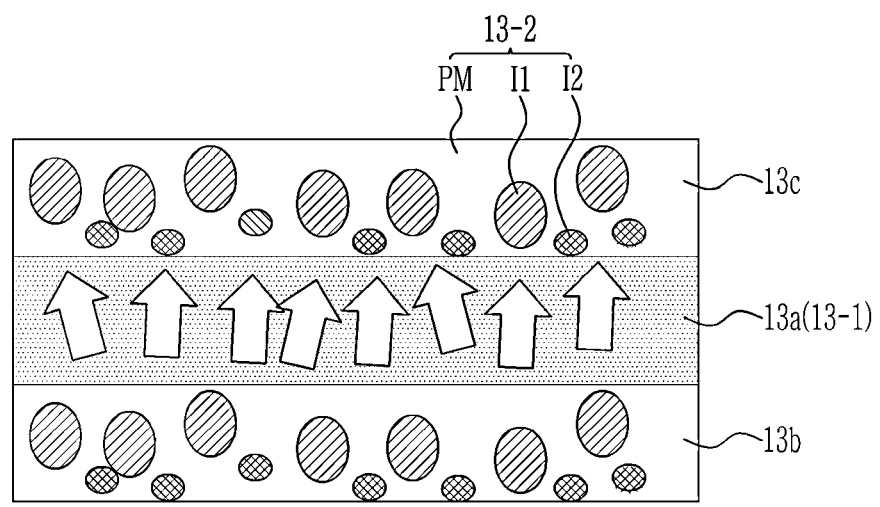
FIG. 4 is a schematic view showing a pyroelectric layer of the temperature sensor of FIG. 3 according to some example embodiments.

FIG. 3 is a cross-sectional view showing an example of a temperature sensor according to some example embodiments, and FIG. 4 is a schematic view showing an example of a pyroelectric layer of the temperature sensor of FIG. 3 according to some example embodiments.

Referring to FIG. 3, the temperature sensor 10 according to some example embodiments includes a first electrode 11, a second electrode 12, and a pyroelectric layer 13 as in some example embodiments, including the example embodiments shown in FIGS. 1 and 2.

However, unlike some example embodiments, including the example embodiments shown in FIGS. 1 and 2, the pyroelectric layer 13 of the temperature sensor 10 according to some example embodiments, including the example embodiments shown in FIG. 3, includes a plurality of layers.

For example, the pyroelectric layer 13 may include a first layer 13a including a ferroelectric polymer (e.g., similarly to the first region 13-1 of the pyroelectric layer 13 shown in FIG. 2) and second layers 13b and 13c including an ionogel that is a composite of a cation I1, an anion I2, and a polymer matrix PM (e.g., similarly to the second region 13-2 of the pyroelectric layer 13 shown in FIG. 2). In some example embodiments, both of the second layers 13b and 13c may be included in the pyroelectric layer 13. In some example embodiments, one of the second layers 13b or 13c may be omitted from the pyroelectric layer 13. In some example embodiments, one or both of the second layers 13b and/or 13c may be referred to as "a second layer" that is on one or both (e.g., opposite) surfaces of the first layer 13a. Detailed descriptions of the ionogel, which is a composite of the ferroelectric polymer, anion I1, cation I2, and polymer matrix (PM) are the same as described above.

The temperature sensor 10 according to some example embodiments may form an electric field in the pyroelectric layer 13 according to temperature changes, so that ions may move under influences of the electric field and thus delay a decrease of a voltage (e.g., electrical signal) output (e.g., generated, transmitted, etc.) therefrom. In order to form the pyroelectric layer 13, the ferroelectric polymer may require an electrical application process called poling to be performed, which may more effectively appear in the polymer matrix including no ions. Accordingly, in some example embodiments, before the first layer 13a including the ferroelectric polymer and the second layers 13b and 13c including the ionogel are combined (e.g., prior to the combination), they (e.g., layers 13a to 13c) are separately formed to facilitate the poling during the manufacturing process and thus more effectively realize the pyroelectric properties of the resultant pyroelectric layer 13.

The aforementioned temperature sensor 10 may operate (e.g., generate electrical signals indicating sensed absolute temperature and/or change in sensed temperature) with a voltage induced at the pyroelectric layer 13 due to the pyroelectric properties of the pyroelectric layer 13 to generate electrical signals indicating sensed (measured) temperature without a separate external energy source (e.g., without using electrical power from an external electrical power source that is external to the temperature sensor 10). Accordingly, the temperature sensor 10 may be configured to be used as an effective self-powered sensor without a separate current and/or voltage source, thereby improving the operating efficiency and flexibility of placement/use of the temperature sensor 10.

In addition, the aforementioned temperature sensor 10 includes the ionogel effectively controlling the behavior (e.g., movement) of ions in addition to the ferroelectric polymer, an active material in the pyroelectric layer 13, and thereby may overcome the limitation of pyroelectric properties of responding only to the instantaneous temperature changes and delay the response (voltage decrease) to the temperature changes and still respond (e.g., cause an electrical signal to be generated by the temperature sensor 10), even though the sensed temperature is maintained at a particular (or, alternatively, predetermined) temperature after the temperature changes, and thus enable the temperature sensor 10 to measure the absolute temperature in addition to measuring changes in the sensed temperature.

Accordingly, the aforementioned temperature sensor 10 may measure the absolute temperature (e.g., generate electrical signals indicating a sensed absolute temperature) without a separate external energy source due to the pyroelectric properties and response delay effects (or voltage decrease delay effects), thereby enabling the temperature sensor 10 to provide improved performance as a temperature sensor that enables additional information to be determined (e.g., measured absolute temperature) with improved compactness and efficiency (e.g., without a separate external energy source). For example, the aforementioned temperature sensor 10 may be a contact-type temperature sensor to be attached to or contacting an object for measurement (e.g., temperature measurement).

The aforementioned temperature sensor 10 may be included in various devices. The various devices may be, for example, various electronic devices for temporarily measuring or monitoring the temperature changes, for example, a health care device having a function of measuring a body temperature and a mobile or smart device.

Furthermore, the aforementioned temperature sensor 10 includes a stretchable electrode and a polymer pyroelectric layer and may flexibly respond to external forces or external movements such as twisting, pressing, and pulling in a particular (or, alternatively, predetermined) direction and thus be effectively applied to wearable devices. The wearable devices may be attached on the surface of a living body such as skin and to an internal living body such as an organ or an indirect means in contact with the living body such as clothing to effectively sense and measure temperature changes (e.g., body temperature). The wearable devices may be, for example, a patch type or a band type.

Figure 5:
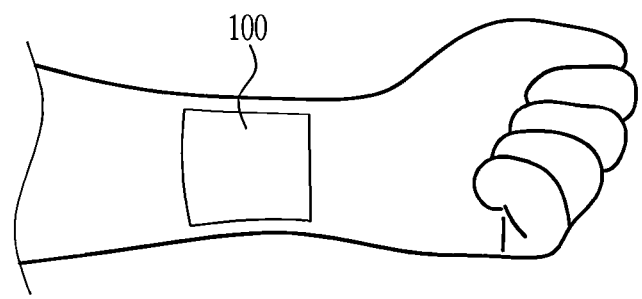
FIG. 5 is a schematic view showing a patch-type wearable device according to some example embodiments.

FIG. 5 is a schematic view showing an example of a patch-type wearable device according to some example embodiments.

Referring to FIG. 5, the patch-type wearable device 100 may be attached to skin, such as a wrist, to measure body temperature changes in real time. The wearable device 100 may further include a processor (for example as shown in FIG. 6), a memory (for example as shown in FIG. 6), and a display unit (e.g., a display device, for example as shown in FIG. 6) in addition to the temperature sensor.

Figure 6:
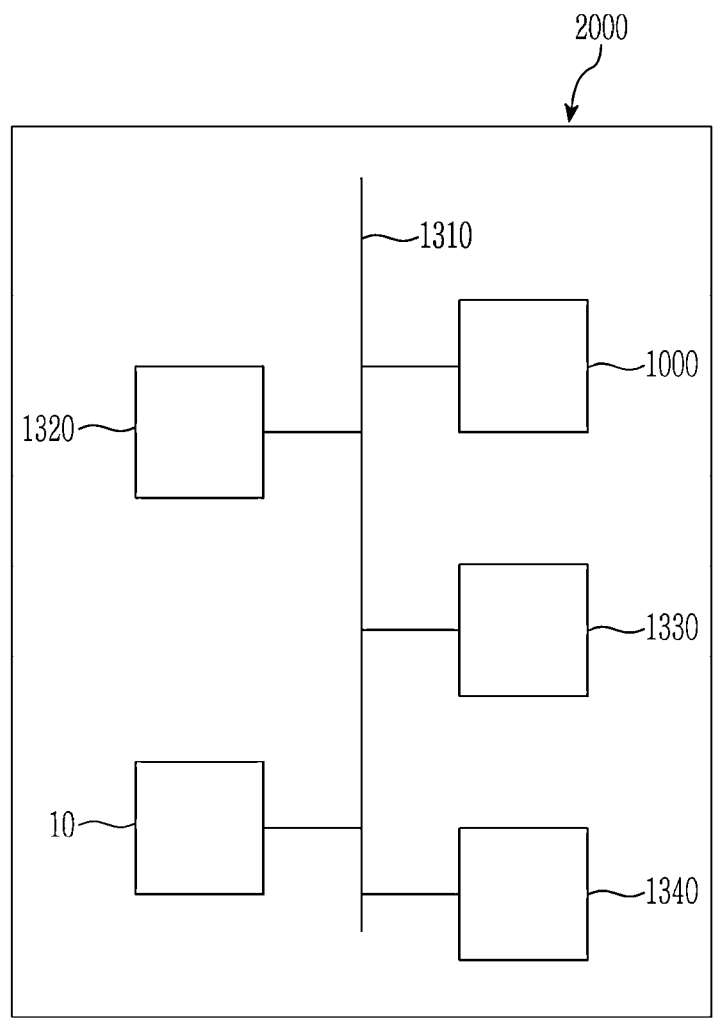
FIG. 6 is a schematic view illustrating an example of a configuration diagram of an electronic device according to some example embodiments.

FIG. 6 is a schematic view illustrating an example of a configuration diagram of an electronic device according to some example embodiments.

Referring to FIG. 6, the electronic device 2000 may include a bus 1310, a processor 1320, a memory 1330, a display device 1000 (e.g., display unit), and a temperature sensor 10. As shown, the electronic device 2000 may further include an electrical power source 1340 (e.g., a battery, which may be a rechargeable battery), but it will be understood that in some example embodiments the electrical power source 1340 may be absent, and it will be understood that in some example embodiments the temperature sensor 10 is configured to operate (e.g., generate electrical signals indicating a measured temperature) without using electrical power from the electrical power source 1340. The temperature sensor 10 may be the temperature sensor 10 according to any of the example embodiments. Information of the processor 1320, memory 1330, display device 1000, and temperature sensor 10 may be transmitted to each other through the bus 1310. In some example embodiments, the display device 1000 may include a light emitting diode (LED) display panel, an organic LED (OLED) display panel, or the like.

The processor 1320 may include one or more articles of processing circuitry such as a hardware including logic circuits; a hardware/software combination such as processor-implemented software; or any combination thereof. For example, the processing circuitry may be a central processing unit (CPU), an arithmetic logic unit (ALU), a digital signal processor, a microcomputer, a field programmable gate array (FPGA), System-on-Chip (SoC), a programmable logic unit, a microprocessor, an application-specific integrated circuit (ASIC), and the like. As an example, the processing circuitry may include a non-transitory computer readable storage device. The processor 1320 may control, for example, a display operation of the display device 1000 or a sensor operation of the temperature sensor 10.

The memory 1330 may be a non-transitory computer readable storage medium, such as, for example, as a solid state drive (SSD) and may store an instruction program (e.g., program of instructions, and the processor 1320 may perform a function related to the temperature sensor 10 and/or the display device 1000 by executing the stored instruction program. For example, the processor 1320 may process electrical signals generated by the temperature sensor 10 to determine an absolute temperature and/or change in temperature that is measured by the temperature sensor 10.

The units, devices, and/or modules described herein may be implemented using hardware constituent elements and software constituent elements. The units, devices, and/or modules described herein may include, may be included in, and/or may be implemented by one or more articles of processing circuitry such as a hardware including logic circuits; a hardware/software combination such as processor-implemented software; or any combination thereof. For example, the processing circuitry may be a central processing unit (CPU), an arithmetic logic unit (ALU), a digital signal processor, a microcomputer, a field programmable gate array (FPGA), System-on-Chip (SoC), a programmable logic unit, a microprocessor, an application-specific integrated circuit (ASIC), and the like. For example, the hardware constituent elements may include microphones, amplifiers, band pass filters, audio-to-digital converters, and processing devices. The processing device may be implemented using one or more hardware devices configured to perform and/or execute program code by performing arithmetic, logic, and input/output operations. The processing device may include a processor, a controller and an arithmetic logic unit, a digital signal processor, a microcomputer, a field programmable array, a programmable logic unit, a microprocessor, or any other device capable of responding to and executing instructions. The processing device may access, store, operate, process, and generate data in response to execution of an operating system (OS) and one or more software running on the operating system.

The software may include a computer program, a code, an instruction, or any combination thereof, and may transform a processing device for a special purpose by instructing and/or configuring the processing device independently or collectively to operate as desired. The software and data may be implemented permanently or temporarily as signal waves capable of providing or interpreting instructions or data to machines, parts, physical or virtual equipment, computer storage media or devices, or processing devices. The software may also be distributed over networked computer systems so that the software may be stored and executed in a distributed manner. The software and data may be stored by one or more non-transitory computer readable storage devices.

Any method as described herein according to any of the example embodiments may be recorded in a non-transitory computer readable storage device including program instructions for implementing various operations of some example embodiments. The storage device may also include program instructions, data files, data structures, and the like alone or in combination. The program instructions recorded in the storage device may be specially designed for some example embodiments or may be known to those skilled in computer software and available for use. Examples of non-transitory computer-readable storage devices may include magnetic media such as hard disks, floppy disks, and magnetic tapes; optical media such as CD-ROM discs, DVDs and/or blue-ray discs; magneto-optical media such as optical disks; and a hardware device configured to store and execute program instructions such as ROM, RAM, flash memory, and the like. The electronic device 2000 or any portion thereof (e.g., processor 1320) may be configured to operate as one or more software modules to perform the operations of some example embodiments.

Hereinafter, some example embodiments are illustrated in more detail with reference to examples. However, the present scope of the inventive concepts is not limited to these examples.

Manufacturing of Temperature Sensor

Example 1

A PVDF-TrFE copolymer (Piezotech, Arkema, France) is dissolved in dimethyl formamide at a concentration of 10 wt % to 20 wt % to prepare a PVDF-TrFE copolymer solution through magnetic stirring. Subsequently, the PVDF-TrFE copolymer solution is spin-coated on a glass substrate at 500 rpm to 1000 rpm for 30 seconds and then, dried under a nitrogen atmosphere at 50° C. to 100° C. for about 3 hours, forming a 7 μm to 40 μm-thick ferroelectric film. Subsequently, the ferroelectric film is separated from the glass substrate in deionized water.

Similarly, a PVDF-HFP copolymer (Sigma Aldrich, U.S.A.) is dissolved in acetone at a concentration of 10 wt % to 15 wt % to prepare a PVDF-HFP copolymer solution through magnetic stirring. Subsequently, an ionic liquid, $[EMIM]^+[TFSI]^-$ (1-ethyl-3-methylimidazolium bis(trifluoromethyl sulfonyl)imide, Sigma Aldrich Co., Ltd./U.S.A.) is added to the PVDF-HFP copolymer solution in an amount that is 1 to 7 times more than an amount of the PVDF-HFP copolymer and then, stirred and dried to prepare an ionogel.

Subsequently, the ionogel is cast respectively on the upper and lower surfaces of the ferroelectric film to form a three-layered pyroelectric structure.

On the glass substrate, silver nanowires (AgNW, Novarials, U.S.A.) diluted in ethanol is spin-coated at 500 rpm to 2000 rpm for 60 seconds and dried at about 100° C. for about 5 minutes, and silica aerogel (JIOS Aerogel/Singapore) dispersed at 4 wt % in ethanol is spin-coated at 500 rpm to 2000 rpm for 60 seconds and then, dried at about 100° C. for about 20 minutes. Subsequently, a PDMS solution (Dow Corning, U.S.A.) prepared by mixing 10 wt % of a cross linking curing agent in a PDMS base is spin-coated at 200 rpm to 500 rpm for 60 seconds and cured at 65° C. to 180° C. for about 30 minutes to 12 hours to form a PDMS/AgNW electrode. The PDMS/AgNW electrode is separated from the glass substrate in deionized water.

Subsequently, the pyroelectric structure is disposed between a pair of the PDMS/AgNW electrodes, manufacturing a temperature sensor.

Reference Example 1

A temperature sensor is manufactured in the same manner as in Example 1, except that the pyroelectric structure is formed using the ferroelectric film alone without the ionogel.

Example 2

A temperature sensor is manufactured in the same manner as in Example 1, except that an ionic salt, $[Li]^+[TFSI]^-$ is dissolved in deionized water instead of the ionic liquid, $[EMIM]^+[TFSI]^-$.

Reference Example 2

A temperature sensor is manufactured in the same manner as in Example 2, except that the pyroelectric structure is formed using the ferroelectric film alone without the ionogel.

Evaluations

The temperature sensors according to Examples and Reference Examples are evaluated with respect to temperature changes over time.

The evaluation is performed by measuring an amount of surface charges of the temperature sensors according to the temperature changes. A Peltier element coupled with a heat sink is used to apply heat to the temperature sensors, a Pt thermocouple is used to measure a temperature thereof, and an electrometer (Keithley) is used to measure the amount of the surface charges of the temperature sensors according thereto. The amount of the surface charges is measured, while the heat is applied for about 60 seconds and removing the heat for 60 seconds, and then, compared with that of a ferroelectric polymer without ions. The measured temperature and the amount of surface charges are differentiated and converted respectively to a temperature change and a current value.

Figure 7:
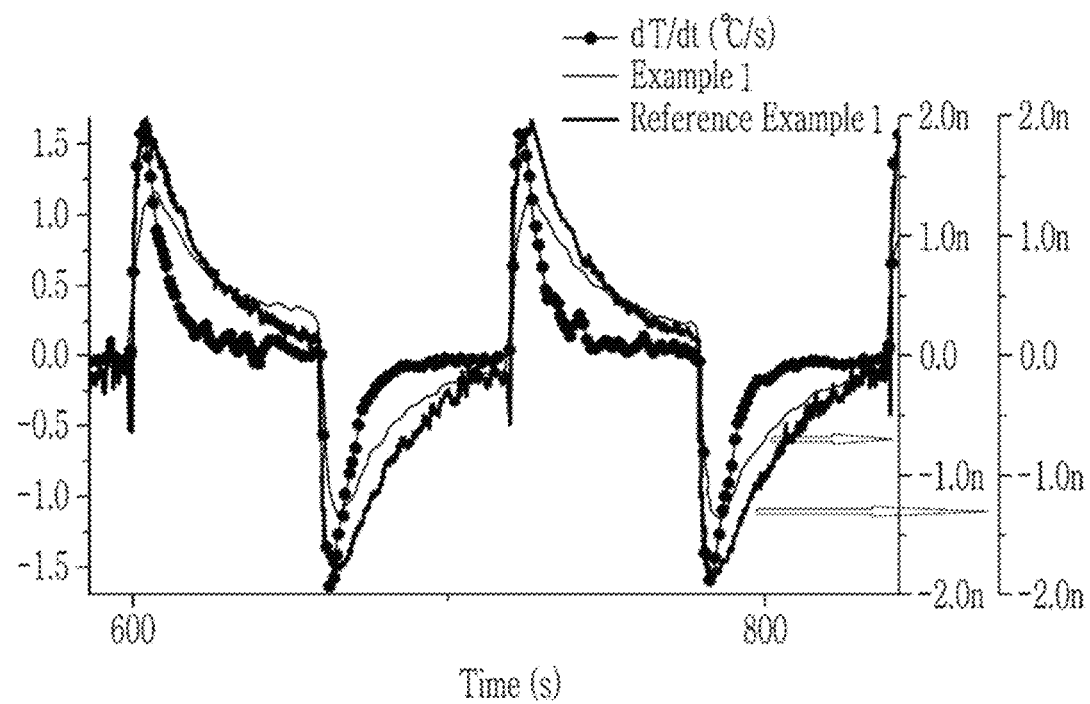
FIG. 7 is a graph showing temperature changes with time of the temperature sensors according to Example 1 and Reference Example 1 according to some example embodiments.
Figure 8:
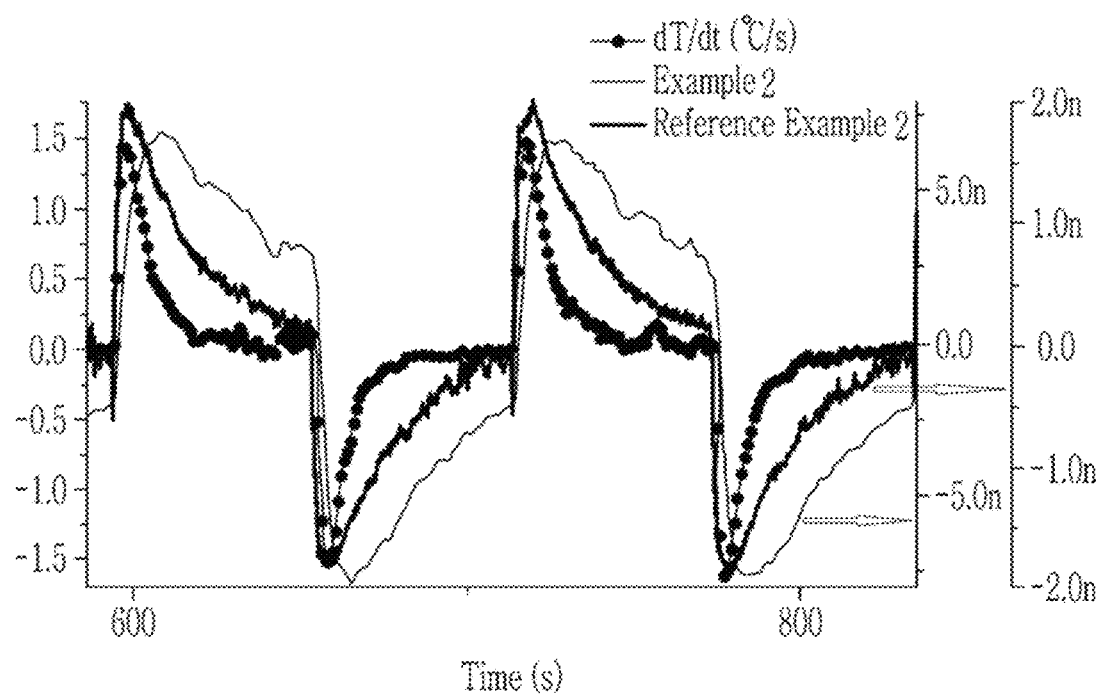
FIG. 8 is a graph showing temperature changes with time of the temperature sensors according to Example 2 and Reference Example 2 according to some example embodiments.

The results are shown in FIGS. 7 and 8.

FIG. 7 is a graph showing temperature changes over time of the temperature sensors according to Example 1 and Reference Example 1, and FIG. 8 is a graph showing temperature changes over time of the temperature sensors according to Example 2 and Reference Example 2.

Referring to FIGS. 7 and 8, the temperature sensors according to Reference Examples 1 and 2 exhibit a substantially similar profile to an external temperature change (dT/dt), but the temperature sensors according to Examples 1 and 2 delay a voltage decrease due to the aforementioned slow movement of ions and thus still exhibit a voltage output (e.g., generate, and thus transmit, an electrical signal) under the constant temperature. Accordingly, the temperature sensors according to Examples 1 and 2 are expected to effectively measure an absolute temperature due to the voltage decrease delay effects.

While the inventive concepts have been described in connection with what is presently considered to be practical example embodiments, it is to be understood that the inventive concepts are not limited to such example embodiments. On the contrary, the scope of the inventive concepts is intended to cover various modifications and equivalent arrangements included within the spirit and scope of the appended claims.

What is claimed is:

1. A temperature sensor, comprising:
   a first electrode;
   a second electrode; and
   a pyroelectric layer between the first electrode and the second electrode, the pyroelectric layer including a ferroelectric polymer and an ionogel,
   wherein the temperature sensor is configured to sense an absolute temperature based on the pyroelectric layer including both the ferroelectric polymer and the ionogel.

2. The temperature sensor of claim 1, wherein
   a Curie temperature of the ferroelectric polymer is about 60° C. to about 140° C.

3. The temperature sensor of claim 1, wherein
   the ferroelectric polymer comprises a fluorine-containing ferroelectric polymer.

4. The temperature sensor of claim 3, wherein
   the ferroelectric polymer is a homopolymer comprising a vinylidene fluoride structural unit, a copolymer comprising a vinylidene fluoride structural unit, or any combination thereof.

5. The temperature sensor of claim 4, wherein
   the ferroelectric polymer is a copolymer comprising the vinylidene fluoride structural unit and a trifluoroethylene structural unit.

6. The temperature sensor of claim 1, wherein
   the ionogel is a composite of a polymer matrix and an ionic liquid.

7. The temperature sensor of claim 6, wherein
   the ferroelectric polymer and the polymer matrix each comprise at least one same structural unit.

8. The temperature sensor of claim 7, wherein
   the at least one same structural unit of the ferroelectric polymer and the polymer matrix includes a vinylidene fluoride.

9. The temperature sensor of claim 6, wherein
   the ionic liquid is included in the ionogel in an amount of about 100 to 400 parts by weight based on 100 parts by weight of the polymer matrix in the ionogel.

10. The temperature sensor of claim 1, wherein
    the pyroelectric layer comprises a composite of the ferroelectric polymer and the ionogel.

11. The temperature sensor of claim 1, wherein
    the pyroelectric layer comprises
    a first layer comprising the ferroelectric polymer, and
    a second layer on one or opposite surfaces of the first layer, the second layer including the ionogel.

12. The temperature sensor of claim 11, wherein
    the ionogel is a composite of a matrix polymer and an ionic liquid, and
    the ferroelectric polymer and the matrix polymer comprise a homopolymer, a copolymer, or any combination thereof, wherein the ferroelectric polymer and the matrix polymer are different polymers and each include a same vinylidene fluoride structural unit.

13. The temperature sensor of claim 12, wherein
    the ionic liquid comprises a cation comprising a lithium ion, pyridinium, imidazolium, pyrrolidinium, piperidinium, ammonium, phosphonium, sulfonium, a derivative thereof, or any combination thereof and an anion comprising a halogen ion, tetrafluoroborate, hexafluorophosphate, triflate, trifluoromethanesulfonyl, bis(trifluoromethanesulfonyl)imide, bis(fluorosulfonyl)imide, cyanoguanidine, a hydrogen sulfate ion, an ethyl sulfate, a derivative thereof, or any combination thereof.

14. The temperature sensor of claim 1, wherein
    the first electrode and the second electrode are stretchable electrodes.

15. The temperature sensor of claim 14, wherein
    each stretchable electrode of the stretchable electrodes comprises an elastomer and conductive nanostructures.

16. The temperature sensor of claim 1, wherein
    the temperature sensor is a self-powered sensor that is configured to generate a voltage according to a temperature change at the temperature sensor exclusively of any electrical power from any energy supply device that is external to the temperature sensor.

17. The temperature sensor of claim 1, wherein
    a temperature change rate with respect to a time sensed by the temperature sensor is lower than a temperature change rate of a temperature change of a measurement target, and
    the temperature sensor is configured to cause a voltage output from the temperature sensor according to the temperature change of the measurement target to be delayed with respect to time.

18. A device comprising the temperature sensor of claim 1.

19. The device of claim 18, wherein the device is a wearable device.

* * * * *